United States Patent [19]
Yamaya et al.

[11] Patent Number: 6,041,614
[45] Date of Patent: Mar. 28, 2000

[54] ICE-CREAM MAKER

[75] Inventors: Hiroo Yamaya; Akira Yoda, both of Nagano-ken, Japan

[73] Assignee: MK Seiko Co., Ltd., Nagano-ken, Japan

[21] Appl. No.: 09/137,325

[22] Filed: Aug. 20, 1998

[30] Foreign Application Priority Data

Jun. 16, 1998 [JP] Japan ................................. 10-169023

[51] Int. Cl.⁷ .................................................. A23G 9/12
[52] U.S. Cl. .................................. 62/340; 165/61; 62/342
[58] Field of Search ................................ 62/342; 165/61, 165/64

[56] References Cited

U.S. PATENT DOCUMENTS

| | | | |
|---|---|---|---|
| 3,724,235 | 4/1973 | Carpigiani | 165/61 |
| 3,811,494 | 5/1974 | Menzel | 62/342 |
| 3,858,498 | 1/1975 | Swenson | 62/342 |
| 3,930,535 | 1/1976 | Menzel | 62/342 |
| 5,201,861 | 4/1993 | Menzel | 62/342 |
| 5,916,248 | 6/1999 | Bravo | 62/342 |

*Primary Examiner*—William E. Tapolcai
*Attorney, Agent, or Firm*—Greenblum & Bernstein, P.L.C.

[57] ABSTRACT

An ice-cream maker comprises: a material vessel into which ice cream materials are to be put; a stirring blade for stirring the materials received in said material vessel; a motor connecting to said stirring blade; a temperature sensor making contact with said material vessel; a cooking chamber into which said material vessel is attached so as to come into close contact with said cooking chamber; a freezing cycle for freezing said material vessel; and a heater for heating said material vessel.

7 Claims, 9 Drawing Sheets

ICE-CREAM MAKER

BACKGROUND OF THE INVENTION

1. Field of the Invention

The present invention relates to an ice-cream maker for making ice cream domestically easily, by which all steps of ice-cream making can be performed automatically.

2. Description of the Related Art

A conventional ice-cream maker comprises a material vessel into which ice-cream materials are put, a freezing cycle for freezing the materials, and a stirring means for stirring the materials. The conventional ice-cream maker is designed so that ice cream is made while materials are frozen and stirred. As an easier ice-cream maker, there is known an ice-cream maker in which ice-cream materials put into a double-structure vessel filled with a low-temperature holding agent are cooled while a stirring blade is rotated manually or by means of motor driving, or the like. Such an ice-cream maker is beginning to be popularized because it is very easy in the point that ice cream can be made simply by merely cooling the low-temperature holding vessel.

Incidentally, egg yolk, sugar, fresh cream and milk are generally used as ice-cream materials. Accordingly, a step of heating the materials is essential for the purposes of: killing bacteria contained in these materials, the vessel, etc.; accelerating the dissolution of the materials; and enhancing the flavor and taste of ice cream. In the conventional ice-cream maker, however, it was necessary to carry out the step of heating and sterilizing the materials separately because the conventional ice-cream maker was provided with no means for heating the materials. Accordingly, it was impossible to make ice cream consistently by such a ice-cream maker.

SUMMARY OF THE INVENTION

It is therefore an object of the present invention to provide an ice-cream maker in which means of heating a material vessel is provided additionally so that the steps necessary for ice-cream making can be performed by one ice-cream maker.

In order to achieve the above object, according to the present invention, provided is an ice-cream maker comprising: a material vessel into which ice cream materials are to be put; a stirring blade for stirring the materials received in the material vessel; drive means for driving the stirring blade; temperature detection means for detecting temperature of the material vessel; a cooking chamber into which the material vessel is attached so as to come into close contact with the cooking chamber; freezing means for freezing the material vessel; and a heating means for heating the material vessel. Preferably, the above ice-cream maker comprises a control means for carrying out: a heating/stirring step of stirring the materials while heating the material vessel up to a bactericidal temperature by driving the heating means and the drive means; a cooling step of cooling the materials by continuously driving the drive means after stopping the heating means; and a freezing step of freezing the materials to a freezing temperature by driving the freezing means.

Further, cooling means for cooling the inside of the cooking chamber which is in a high-temperature state after heating, is provided additionally so that the step of cooling the materials is carried out, between the heating/stirring step and the freezing step, by driving the cooling means after stopping the heating means while continuously driving the drive means.

In the ice-cream maker may comprises a storage means for storing a plurality of menus, a selection means for selecting a desired menu from the storage means, and a notification means for notifying the completion of each step or menu. Menus for carrying out the heating/stirring step, the cooling step and the freezing step continuously, menus for carrying out the heating/stirring step and the cooling step, and menus for carrying out only the freezing step are stored in the storage means.

DETAILED DESCRIPTION OF THE PREFERRED EMBODIMENT

First Embodiment

Figure 1:
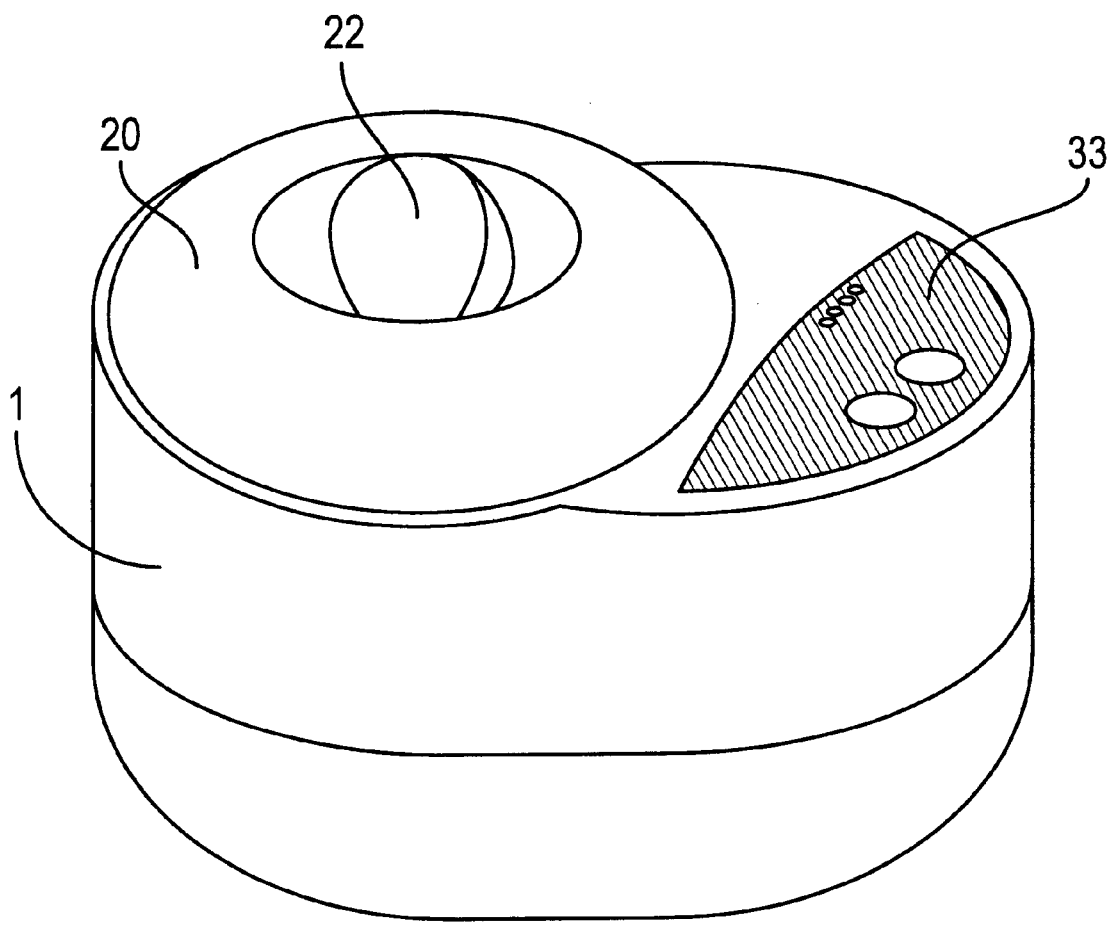
FIG. 1 is an external appearance view showing an ice-cream maker according to an embodiment of the present invention.
Figure 2:
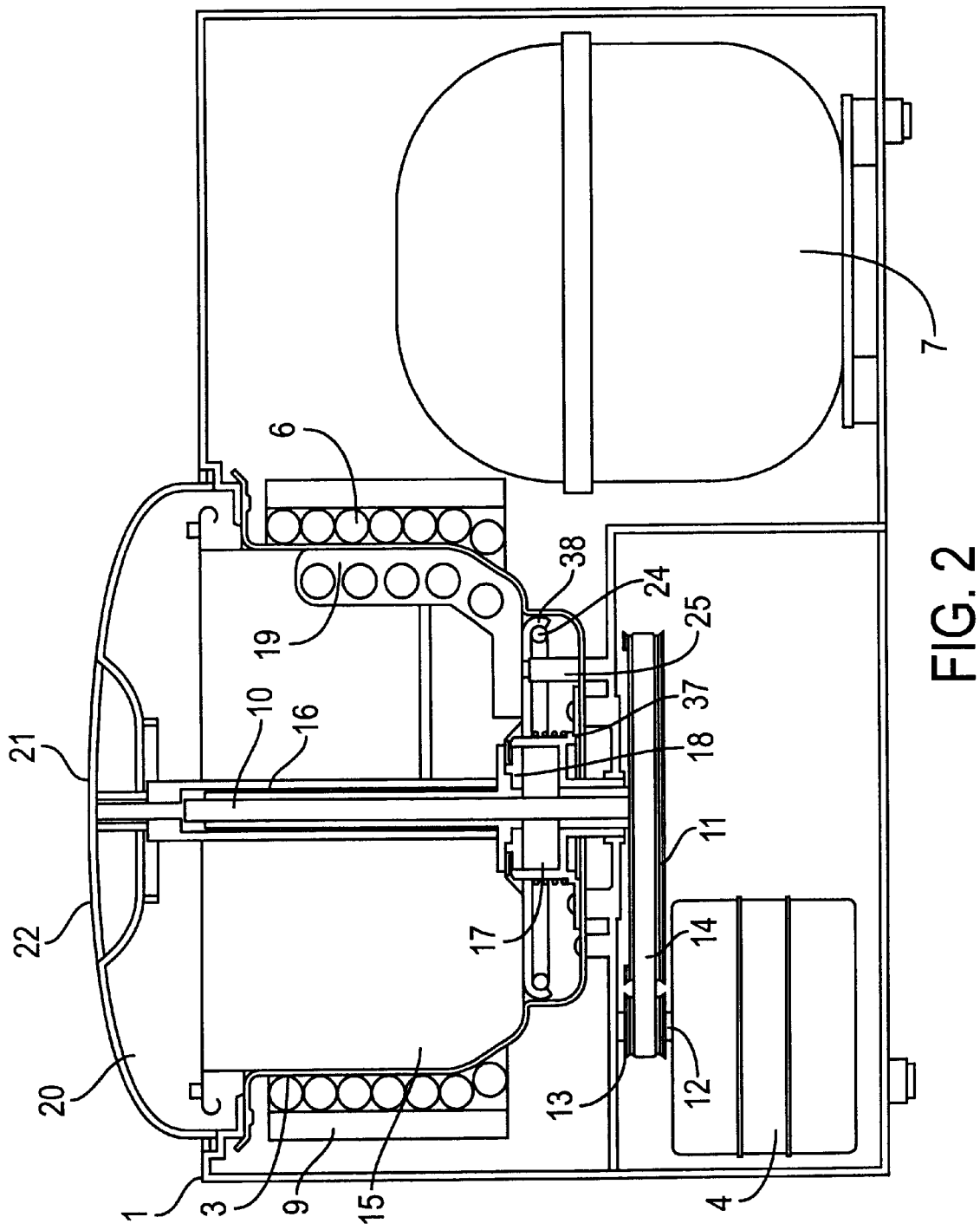
FIG. 2 is a front internal structure view of the ice-cream maker depicted in FIG. 1.
Figure 3:
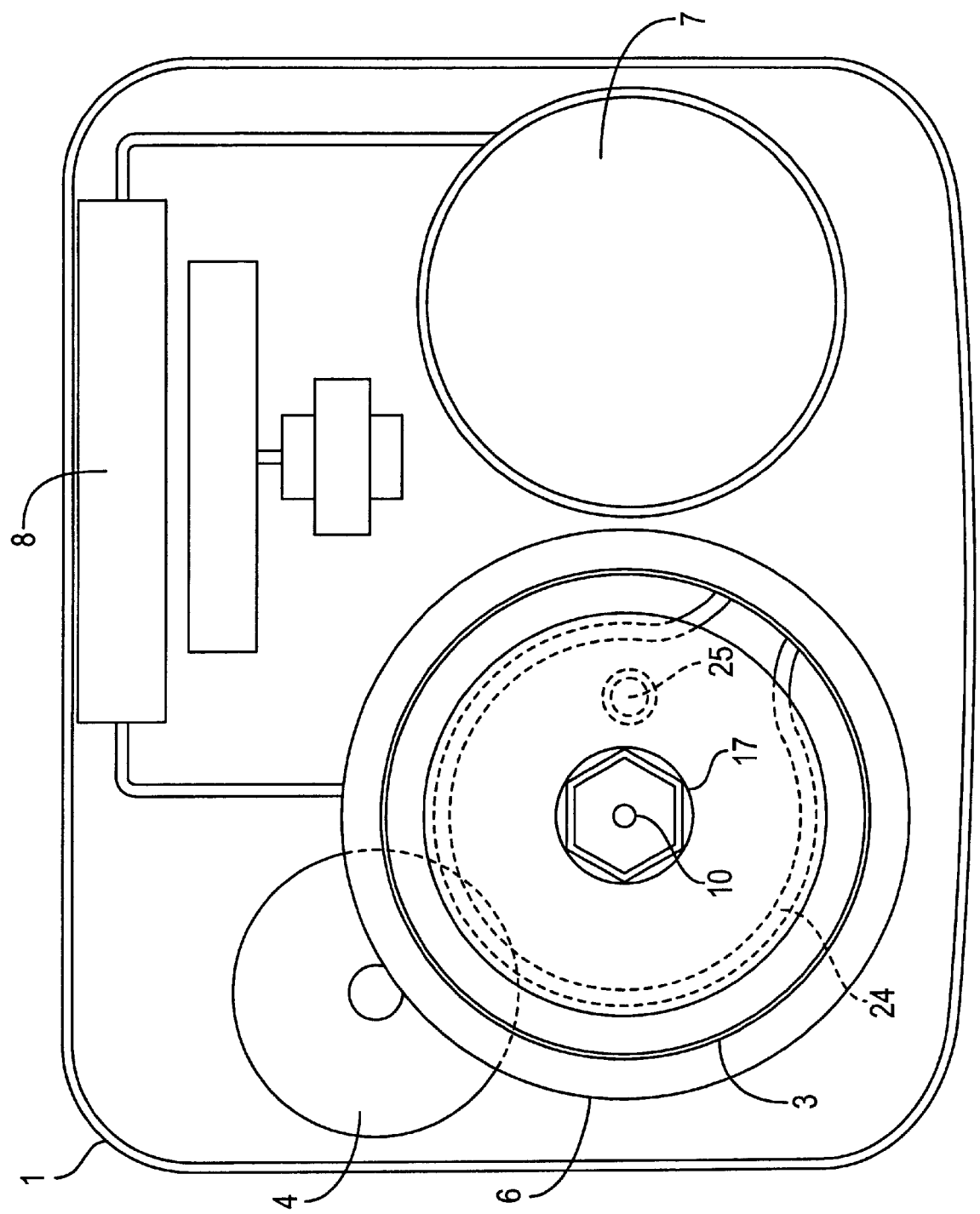
FIG. 3 is a plan internal structure view of the ice-cream maker depicted in FIG. 1.

An embodiment of the present invention will be described below with reference to the drawings. FIG. 1 is an external appearance view showing an ice-cream maker according to an embodiment of the present invention; FIG. 2 is a front internal structure view thereof; and FIG. 3 is a plan internal structure view thereof. The reference numeral 1 designates a body casing. A base 2 is fixed to a half of the bottom portion of the body casing 1. A cooking chamber 3 is provided on an upper surface of the base 2. A motor 4 is provided under a lower surface of the base 2. The reference numeral 5 designates a freezing cycle which is composed of a vaporizer 6, a compressor 7, and a condenser 8. The vaporizer 6 is wound on an inner circumferential surface of the cooking chamber 3. The compressor 7 and the condenser 8 are disposed together with the cooling chamber 3 on the bottom surface of the body casing 1. A heat insulating material 9 is provided to surround the outer surface of the cooking chamber 3. A rotation shaft 10 is formed in the center of the inner bottom portion of the cooking chamber 3 so as to project. A large pulley 11 is attached to a lower end portion of the rotation shaft 10. The large pulley 11 is linked, through a V-belt 14, to a small pulley 13 attached to a drive shaft 12 of the motor 4.

A material vessel 15 is attached in the cooking chamber 3 so as to come into close contact with the vaporizer 6 wound on the inner surface of the cooking chamber 3. A boss portion 16 through which the rotation shaft 10 passes, stands in the center of the inner bottom portion of the material vessel 15 so as to become higher than the liquid surface of the materials put into the material vessel 15. A fitting portion 18 is provided in a rear bottom surface of the material vessel 15 so as to be fitted to a plan-view hexagonal fitting, receptacle portion 17 formed in the inner bottom surface of the cooking chamber 3. A stirring, blade 19 is attached to the boss portion 16 of the material vessel 15. The stirring, blade 19 rotates in the material vessel 15 in linkage with an end of the rotation shaft 10 passing, through the boss portion 16. A cover 20 is provided for covering the upper surface of the cooking chamber 3. A support portion 21 for rotation-supporting, the end of the rotation shaft 10 is formed in a center inner surface of the cover 20. A knob 22 for detachment is formed in a center upper surface of the cover 20. A plurality of vent holes 23 are formed in the circumference of the cover 20 so as to allow hot air generated from the material vessel 15 to escape.

A heater 24 is fixed to a lower surface of a pedestal 38 swingably supported by a spring 37 provided in the outer circumference of the fitting receptacle portion 17. This pedestal 38 is pressure-contacted, by the elastic force of the spring 37, to the bottom surface of the material vessel 15 attached in the cooking chamber 3, so that heat from the heater 24 is transmitted to the material vessel 15 securely and evenly. A temperature sensor 25 is provided in the bottom surface of the cooking chamber 3 so as to pass through a part of the pedestal 38 and contact with the bottom surface of the material vessel 15 directly.

Figure 4:
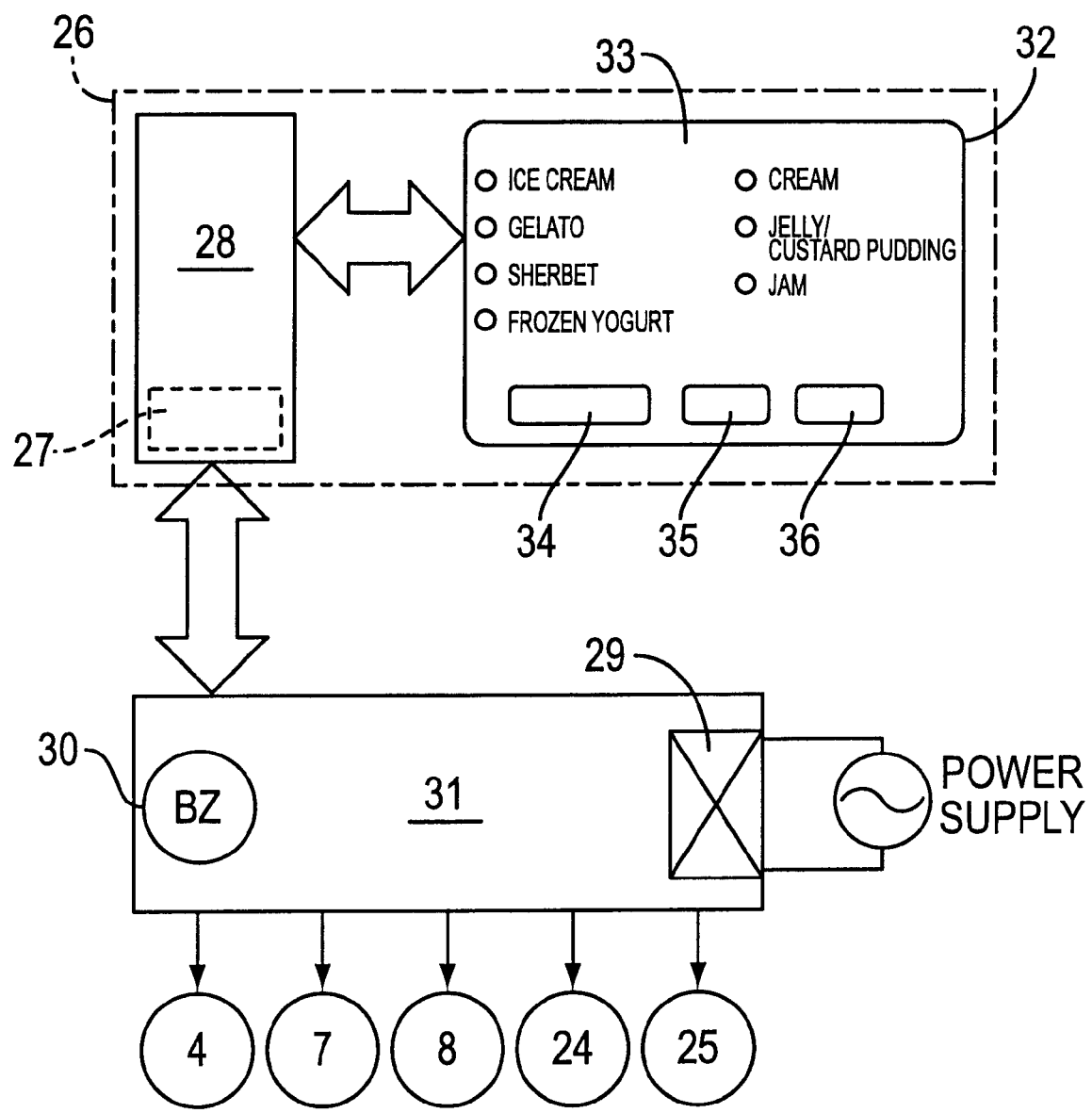
FIG. 4 is a block diagram showing a control system in the ice-cream maker depicted in FIG. 1.

FIG. 4 is a block diagram showing a control system in this embodiment. A control portion 26 comprises: a micro-computer 28 including a memory 27 built in, and a power board 31 having a transformer 29 and a buzzer 30. The motor 4, the compressor 7, the condenser 8, the heater 24, the temperature sensor 25 and the micro-computer 28 are connected to the power board 31. The micro-computer 28 is provided with an operation panel 32.

The operation panel 32 has a display panel 33 for displaying menu names by means of LED, a menu key 34 for selecting the type of ice cream to be made, a start key 35 for starting cooking, and a cancel key 36 for stopping the operation and canceling the setting. Incidentally, the menus exemplified by this embodiment are not limited specially to the number of menus, the type thereof, etc. described in the embodiment.

Figure 5:
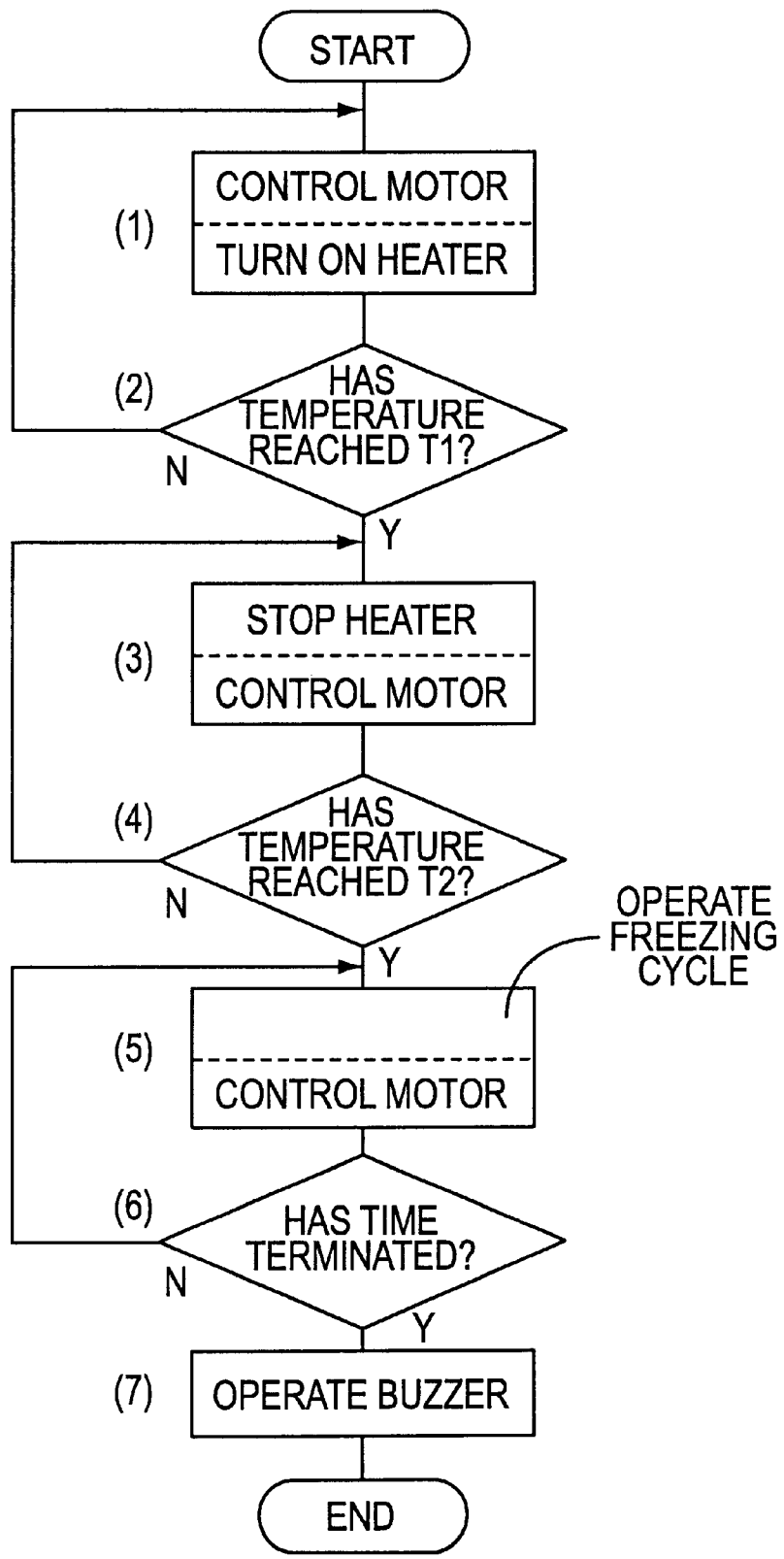
FIG. 5 is a flow chart showing the operation of the ice-cream maker depicted in FIG. 1.
Figure 6:
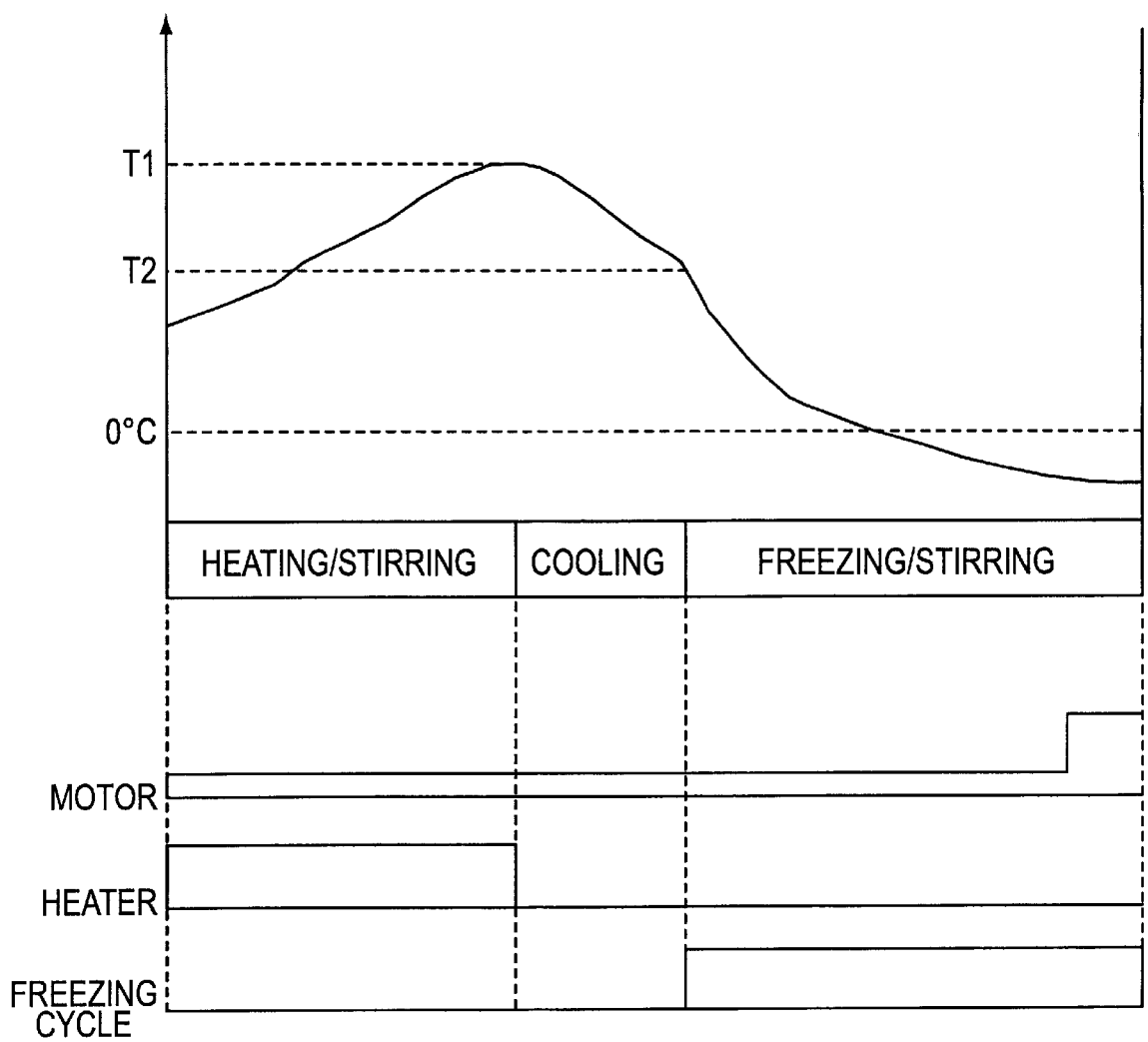
FIG. 6 is a time chart of the ice-cream maker depicted in FIG. 1.

An ice-cream making method by means of such a ice-cream maker will be described below. The fitting portion 18 of the material vessel 15 and the fitting receptacle portion 17 of the cooking chamber 3 are attached to each other so as to be fitted to each other. The rotation shaft 10 is made to pass through the boss portion 16. The stirring blade 19 is attached to an end of the rotation shaft 10. Ice cream materials, that is, milk, sugar, fresh cream and egg yolk are set in the material vessel 15. When an "ice cream" menu is selected and the start key 35 is turned-on on the operation panel 32, the micro-computer 28 reads an ice cream menu program from the memory 27. Thus, an operation is started on the basis of the flow chart of FIG. 5 and the time chart of FIG. 6.

First, while the stirring blade 19 is rotated at a low speed by driving the motor 4, the heater 24 is supplied with a current to thereby carry out stirring and heating/sterilizing of the materials (Step 1). In this step, there arise an effect of killing unwanted bacteria contained in milk and egg or in the material vessel per se and an effect of making sugar easily soluble.

When the temperature of the material vessel 15 detected by the temperature sensor 25 reaches a bactericidal temperature T1 (=70 to 80° C.) (Step 2), the heater 24 is stopped while the motor 4 is continuously rotated at a low speed so that heat of the materials is positively radiated and cooled (Step 3). When the temperature of the cooking chamber 3 detected by the temperature sensor 25 reaches a temperature T2 (Step 4), the motor 4 is continued to rotate at a low speed as it is and the compressor 7 and the condenser 8 are driven to keep the cooking chamber 3 at a freezing temperature (=−20° C.) to solidify the materials as ice cream (Step 5). When termination of the cooking time is detected by a timer (Step 6), the completion of ice cream is notified by the buzzer (Step 7). Thus, work is terminated.

Although the operation of the ice cream menu from the heating/stirring step to the freezing step has been described above, it is a matter of course that any one of the steps is carried out selectively in accordance with necessary operation, for example, when gelato, sherbet or frozen yoghurt which requires only the freezing step is produced or cream, jelly, custard pudding or jam which requires only the heating/stirring step is produced.

According to the configuration of the present invention as described above, the materials after heated can be cooled positively, so that the temperature can be dropped to an operable temperature rapidly even in the case where an inexpensive freezing cycle is used. Incidentally, the present invention is not limited to the aforementioned embodiment. For example, the invention is applicable to a case where a low-temperature holding agent is used as the freezing means or a case where a fan heater is used as the heating means. In the case where a fan heater is used, further positive heat radiation from the materials can be performed in the cooling step if a current supply to the heater is turned off while only a fan is driven.

Second Embodiment

Figure 7:
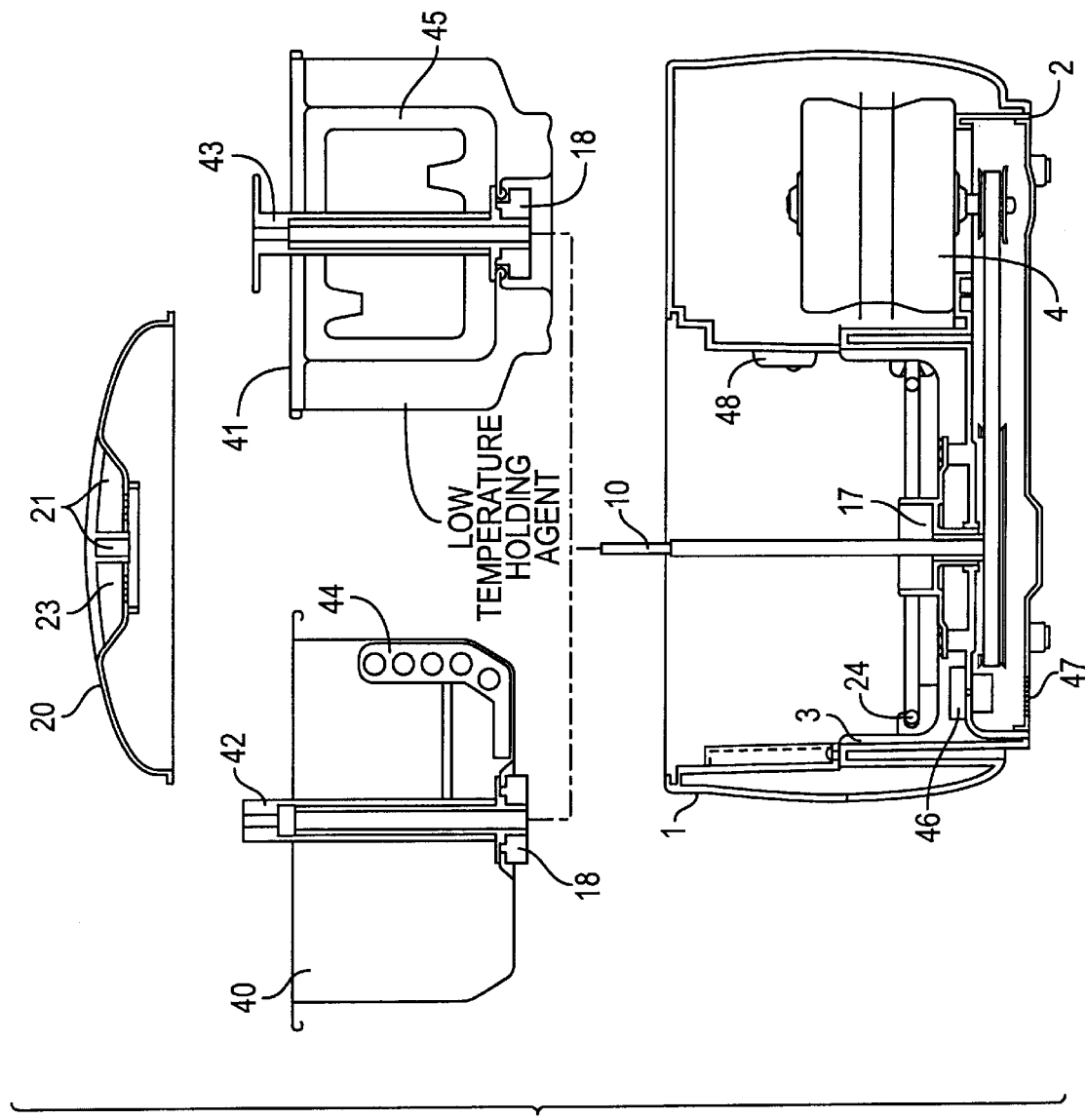
FIG. 7 is an internal explanatory view showing an ice-cream maker according to another embodiment of the present invention.

FIG. 7 is an explanatory view showing another embodiment of such a case described above. In this second embodiment, parts common to those in the first embodiment are represented by common reference numerals, and description about those parts is partly omitted.

In FIG. 7, the reference numeral 40 designates a vessel for exclusive-use for heating which is used for cooking by heating; and 41, a vessel for exclusive-use for cooking which is used for cooking by freezing. Either one of the vessels is attached in the cooking chamber 3 at a slight clearance from the inner surface of the cooking chamber 3. That is, the heating vessel 40 is attached when the heating/stirring step is to be carried out. The cooling vessel 41, which is constituted by a double vessel filled with a low-temperature holding agent in its circumference except its upper surface, is attached when the freezing step is to be carried out. Further, boss portions 42 and 43 are formed in inner bottom center portions of the vessels 40 and 41 respectively in the same manner as in the aforementioned material vessel 5 and stirring blades 44 and 45 are attached to the boss portions 42 and 43 respectively. Incidentally, the stirring blades 44 and 45 may be provided as a common member.

The reference numeral 46 designates a fan device which is provided on the upper surface of the base 2 so that air is sent toward the outer bottom surface of the cooking chamber 3 to prevent the material vessel from being contaminated with dust raised in the cooking chamber 3 at the time of sending air. In such a manner, the bottom portion of the cooking chamber 3 heated by current conduction of the heater 25 provided in the inner bottom portion of the cooking chamber 3 can be cooled rapidly. The reference numeral 47 designates vent holes of the fan device 46 which are opened in the bottom portion of the body casing 1. A temperature sensor 48 is provided so as to project from the inner surface of the cooking chamber 3. In the condition in which the heating vessel 40 or the cooling vessel 41 is attached, the temperature sensor 48 comes into contact with the outer circumferential surface of the vessel to detect the temperature of the vessel.

Figure 8:
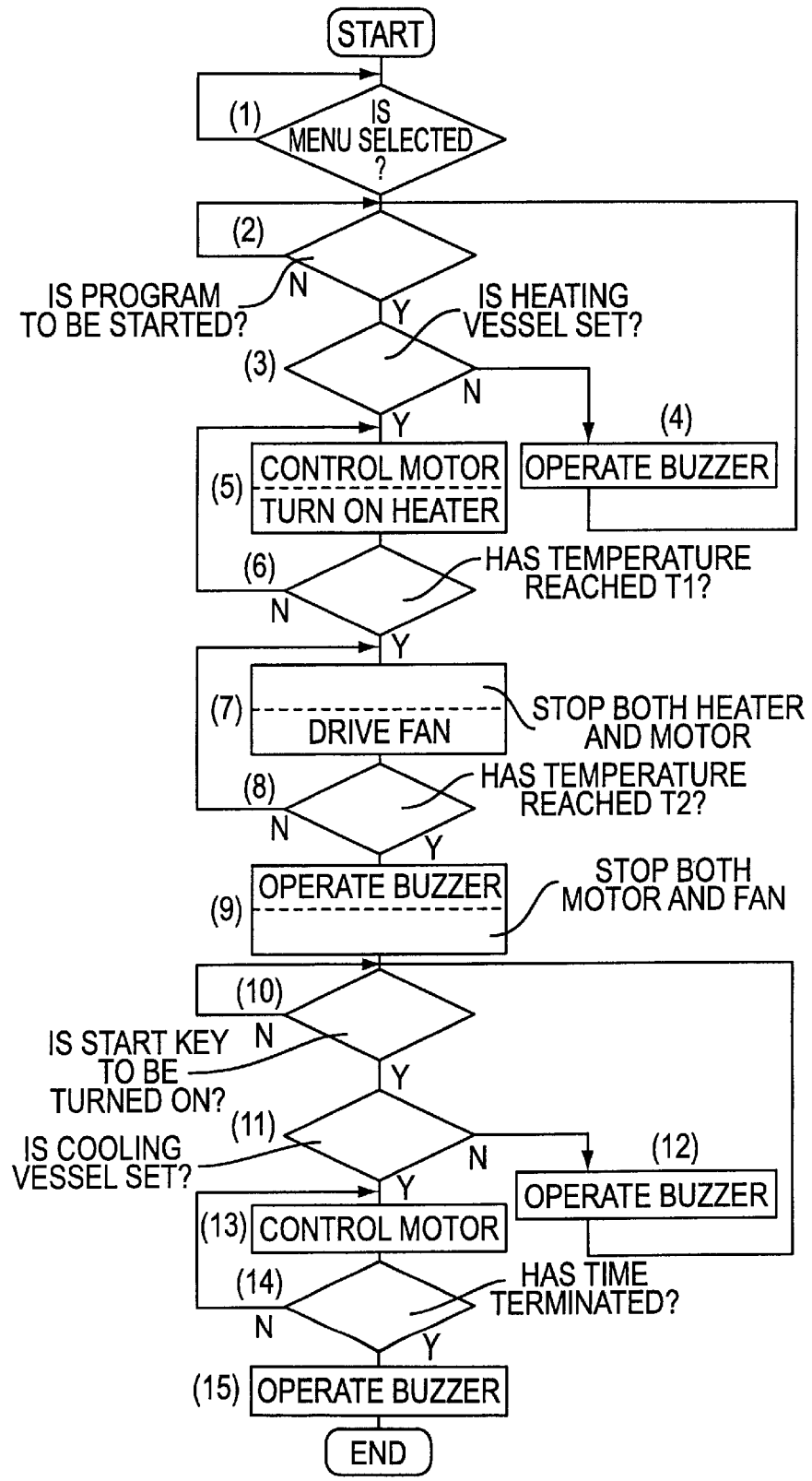
FIG. 8 is a flow chart showing the operation of the ice-cream maker depicted in FIG. 7.
Figure 9:
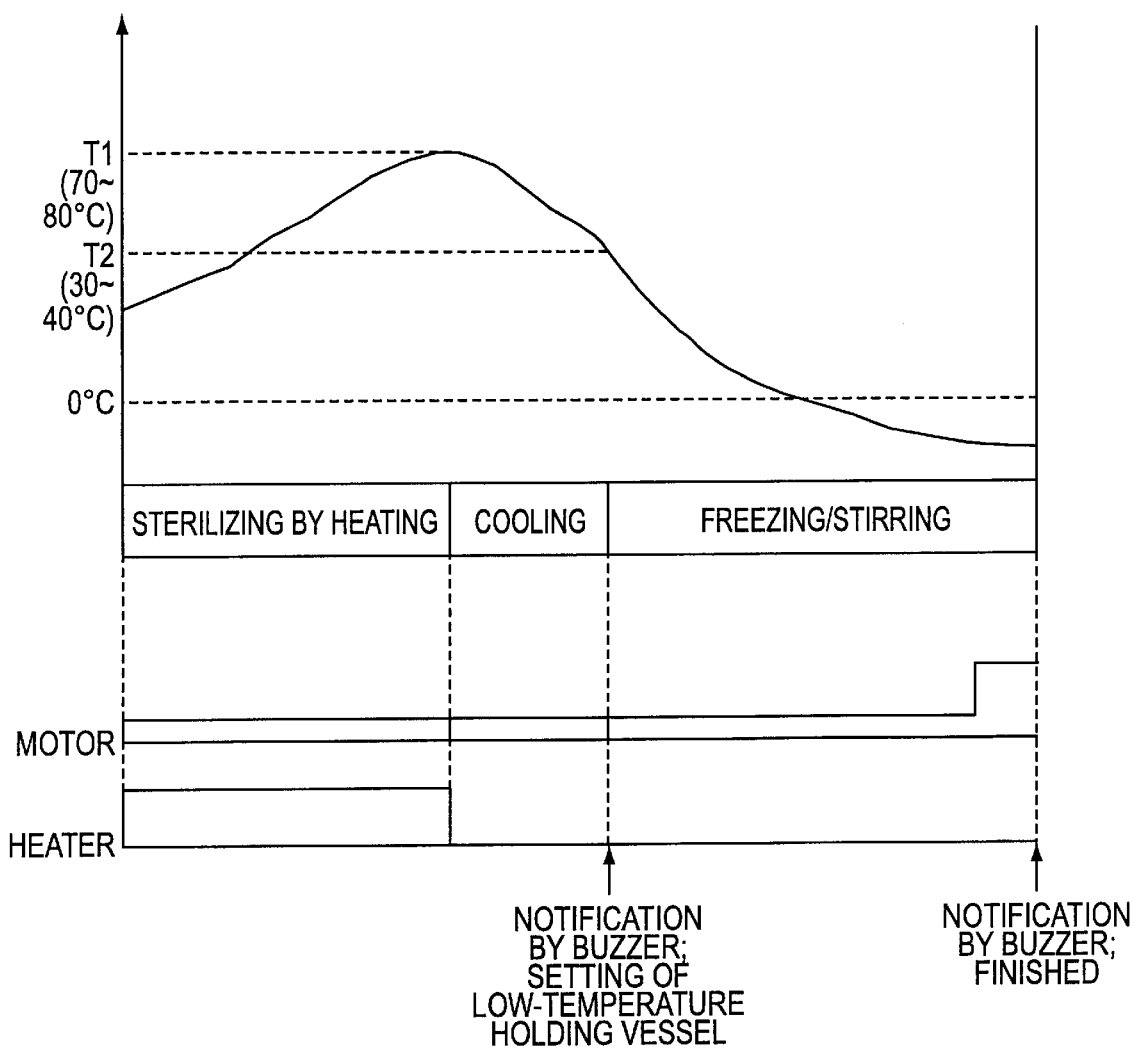
FIG. 9 is a time chart of the ice-cream maker depicted in FIG. 7.

The operation of the ice-cream maker having such exclusive-use material vessels provided in accordance with the required steps will be described below with reference to the flow chart of FIG. 8 and the time chart of FIG. 9. First, the stirring blade 44 is attached to the boss portion 42 of the heating vessel 40 and then raw materials for ice cream, that is, milk, sugar, fresh cream and egg yolk are set. The heating vessel 40 is set in the cooking chamber 3 and then the cover 20 is fitted to the upper surface of the cooking chamber 3.

When an "ice cream" menu is selected by the menu key 34 while confirmed on the display panel 33 (Step 1) and the start key 35 is turned on (Step 2), the micro-computer 28 reads an ice cream menu program from the memory 27. Thus, an operation is started.

First, a judgment is made on the basis of the temperature of the material vessel detected by the temperature sensor 48 as to whether the set material vessel is the heating vessel 40 or not (Step 3). If the set material vessel is not the heating vessel 40, the buzzer 30 is sounded and the program is not started (Step 4). If the heating vessel 40 is set accurately, the motor 4 and the heater 24 are driven to carry out the heating/stirring step of heating the heating vessel 40 while rotating the stirring blade 44 at a low speed (Step 5).

When the temperature of the heating vessel 40 detected by the temperature sensor 48 reaches the bactericidal temperature T1 (Step 6), the heater 24 is stopped and the fan device 46 is driven instead of the heater 24 while the motor 4 is driven continuously (Step 7). As a result, the bottom portion of the cooking chamber 3 in the periphery of the heater 24 is cooled, so that heat of the materials in the heating vessel 40 is released synergistically positively. When the temperature of the cooking chamber 3 is dropped to a predetermined temperature T2 by the fan device 46 (Step 8), the fan device 46 and the motor 4 are stopped and the termination of the heating/stirring step is notified by the buzzer 30 (Step 9). Hearing the buzzer sound, the user takes the heating vessel 40 out of the cooking chamber 3. At the same time, the user transfers the ice-cream raw materials sterilized by heating, to the cooling vessel 41 which is freezed in a freezing chamber, or the like, in advance. The user sets this cooling vessel 41 in the cooking chamber 3.

When the start key 35 is turned on again in this condition (Step 10), a judgment is made by the temperature sensor 48 as to whether the set material vessel is the cooling vessel 41 or not (Step 11). If the set material vessel is not the cooling vessel 41, the buzzer 30 is sounded and the program is not re-started (Step 12). If the cooling vessel 41 is set accurately, the motor 4 is rotated at a low speed and then rotated at a high speed to perform overrunning (Step 13). As a result, the materials are cooled by the cooling vessel 41 so as to be solidified as ice cream. When termination of the cooking time is detected by a timer (Step 14), the completion of ice-cream making is notified by the buzzer 30 (Step 15) and the program is operated to terminate the work.

According to the aforementioned configuration, a low-temperature holding agent more inexpensive than the freezing cycle can be used. The cooling ability of the cooling vessel is prevented from being lowered by erroneously mounting the cooling vessel in the cooking chamber in a high-temperature state after heated. Furthermore, the cooling step is carried out in a short time because of the function of the fan device which cools the inside of the cooling chamber.

According to the present invention, the step of sterilizing the materials by heating can be carried out, so that all the steps necessary for ice-cream making can be carried out by one ice-cream maker. Further, by the provision of the cooling step, the materials heated to 70–80° C. after the heating/stirring step can be cooled to about a room temperature rapidly so that the heating/stirring step can be shifted to the freezing step smoothly. In addition to the continuous rotation of the stirring blade, the provision of cooling means such as a fan, or the like, makes the cooling process more effective.

Further, when configuration is made so that each of the steps can be carried out individually, the number of menus allowed to be made is increased so that the commercial value of the ice-cream maker can be enhanced.

Thus, all the steps of ice-cream making can be automated, so that ice cream can be made domestically easily.

We claim:

1. An ice-cream maker comprising:

a material vessel into which ice cream materials are to be put;

a stirring blade for stirring the materials received in said material vessel;

a drive for driving said stirring blade;

a temperature detector for detecting a temperature of said material vessel;

a cooking chamber into which said material vessel is inserted so as to come into close contact with said cooking chamber;

a freezer for freezing the material vessel;

a heater for heating said material vessel;

a controller for carrying out:

a heating/stirring process including stirring the materials while heating said material vessel up to a bactericidal temperature by driving said heater and said drive;

a cooling process of cooling the materials by continuously driving said drive after stopping said heater; and a freezing process of freezing the materials to a freezing temperature by driving said freezer;

a storing device for storing a plurality of interface display menus;

a selector for selecting a desired interface display menu from said storage device; and a notifier for notifying said controller of termination of each process.

2. The ice-cream maker according to claim 1, wherein said material vessel includes a heating vessel and a cooling vessel, wherein a bottom portion of said heating vessel makes contact with said heater and a bottom portion of said cooling vessel is positioned distant from said heater.

3. The ice-cream maker according to claim 1, wherein said interface display menus stored in said storage device include:

an interface display menu for instructing said processor to carry out the heating/stirring process, the cooling process and the freezing process continuously;

an interface display menu for instructing said processor to carry out the heating/stirring process and the cooling process; and an interface display menu for instructing said processor to carry out only freezing process.

4. An ice-cream maker comprising:

a material vessel into which ice cream materials are to be put;

a stirring blade for stirring the materials received in said material vessel;

a drive for driving said stirring blade;

a temperature detector for detecting a temperature of said material vessel;

a cooking chamber into which said material vessel is inserted;

a freezer for freezing said material vessel;

a heater for heating said material vessel;

a cooler for cooling the materials heated by said heater, to a predetermined temperature;

a controller for carrying out:
- a heating/stirring process including stirring the materials while heating said material vessel up to a bactericidal temperature by driving said heater and said drive;
- a cooling process of cooling the materials by driving said cooler after stopping the heater while continuously driving said drive; and
- a freezing process of freezing the materials down to a freezing temperature by driving said freezer;

a storing device for storing a plurality of interface display menus;

a selector for selecting a desired interface display menu from said storage device; and a notifier for notifying said controller of termination of each process.

5. The ice-cream maker according to claim 4, wherein said interface display menus stored in said storage device include:

an interface display menu for instructing said processor to carry out the heating/stirring process, the cooling process and the freezing process continuously;

an interface display menu for instructing said processor to carry out the heating/stirring process and the cooling process; and an interface display menu for instructing said processor to carry out only the freezing process.

6. The ice-cream maker according to claim 4, wherein said material vessel includes a heating vessel and a cooling vessel, wherein a bottom portion of said heating vessel makes contact with said heater and a bottom portion of said cooling vessel is positioned distant from said heater.

7. An ice-cream maker comprising:

a material vessel into which ice cream materials are to be put;

a stirring blade for stirring the materials received in said material vessel;

a motor connecting to said stirring blade;

a temperature sensor making contact with said material vessel;

a cooking chamber into which said material vessel is inserted so as to come into close contact with said cooking chamber;

a freezing cycle for freezing said material vessel; and a heater for heating said material vessel;

wherein said material vessel includes a heating vessel and a cooling vessel, wherein a bottom portion of said heating vessel makes contact with said heater and a bottom portion of said cooling vessel is positioned distant from said heater.

* * * * *